United States Patent [19]

Yamamoto et al.

[11] Patent Number: 4,633,335
[45] Date of Patent: Dec. 30, 1986

[54] MAGNETIC RECORDING SYSTEM FOR TIME-LAPSE MAGNETIC VIDEO RECORDER

[75] Inventors: Makoto Yamamoto, Katsuta; Takashi Kubota, Mito; Katsumi Mikamo, Katsuta, all of Japan

[73] Assignee: Hitachi, Ltd., Tokyo, Japan

[21] Appl. No.: 590,844

[22] Filed: Mar. 19, 1984

[30] Foreign Application Priority Data

Mar. 25, 1983 [JP] Japan .................................. 58-48790

[51] Int. Cl.⁴ ........................................... H04N 5/782
[52] U.S. Cl. ................................................. 360/35.1
[58] Field of Search .................... 360/10.3, 33.1, 35.1, 360/70, 75, 76; 358/312, 327

[56] References Cited

U.S. PATENT DOCUMENTS

| 4,035,843 | 7/1977 | Tanimura | 360/35.1 |
| 4,238,776 | 12/1980 | Tanaka | 360/10.3 |
| 4,306,254 | 12/1981 | Koda et al. | 360/10.3 |

Primary Examiner—Donald McElheny, Jr.
Attorney, Agent, or Firm—Antonelli, Terry & Wands

[57] ABSTRACT

In a magnetic recording system for recording frequency modulated video signals on a magnetic tape field by field at intervals of a predetermined time by a plurality of rotary video heads, during each recording period the rotation speed of the rotary video heads is made different from the steady-state rotation speed and the video signals are recorded thereby making the period of each field of the recorded video signals an integral multiple of the horizontal scanning period.

8 Claims, 9 Drawing Figures

MAGNETIC RECORDING SYSTEM FOR TIME-LAPSE MAGNETIC VIDEO RECORDER

BACKGROUND OF THE INVENTION

The present invention relares to a magnetic recording and reproducing system for recording video signals on a magnetic tape and reproducing the recorded signals and more particularly to a magnetic recording system for intermittently recording successive television camera signals or television signals.

In a magnetic recording system for recording the video signals produced by a television camera or the video signals produced by receiving a television program, a magnetic tape is helically wrapped more than 180 degrees around a drum for guiding the magnetic tape and the signals are recorded on the magnetic tape by a plurality of rotary video heads. In this type of magnetic recording system, the video signal for one field is successively recorded on each of video tracks formed on a magnetic tape in the form of recording paths which are each inclined at a given angle with respect to the lengthwise direction of the tape.

With this type of magnetic recording system, attempts have recently been made in which the video signals produced by a television camera or the like are intermittently recorded at intervals of a predetermined time on a magnetic tape to make a long-time recording on the single reel of the magnetic tape. This system has been used as a camera monitoring system for recording, for example, the video signals from a burglar-monitor camera or for the purpose of recording information such as documents.

In the case that such an intermittent recording is desired, differing from the ordinary continuous recording, the magnetic tape is run intermittently so that during the recording the movement of the magnetic tape is stopped and in this rest condition the video signal for one field is recorded on one video track and then the recording is stopped until the next recording time is reached. During this rest or pause period the magnetic tape is moved by one video track and the video signal for deriving one field is recorded at the next recording time. By thus effecting the field skipping, it is possible to record long-play video signals on a single reel of the magnetic tape. To reproduce thus recorded magnetic tape, the plurality of video heads repeatedly reproduce a number of times each of the video tracks and reproduce it as a still picture.

Then, since the video signals obtained from a television camera or a television program are video signals produced by interlaced scanning, the period of the video signal for one field becomes 262.5 H (H represents one horizontal period) according to the NTSC system. (In the discussion to follow, the parenthesized figures relate to the case of 312.5 H according to CCIR system). As a result, where the same video track is repeatedly reproduced by two video heads alternately and the output signals of the video heads are joined to produce a reproduced video signal, the horizontal synchronizing signal spacing becomes 0.5 H (0.5 H) at the joint of the output signals from the video heads and this causes a skew to appear in the reproduced picture.

In the past, in order to prevent the occurence of such skew, an attempt has been made in which during the reproduction the output signal from one of two reproducing magnetic heads are passed through a delay circuit having a 0.4 H delay time and the resulting video signal delayed by 0.5 H and the output signal from the other magnetic head are alternately reproduced by switching thereby ensuring a time interval of 1 H at the time of switching of the heads.

However, this type of reproducing system employs a glass delay element as a delay circuit so that if the video signal is simply delayed by the glass delay element, the quality of the video signal is deteriorated due to the characteristics of the glass delay element. Thus, in order to prevent any deterioration of the quality of the video signal, it is necessary to supply the video signal to a balanced modulator which converts the video signal to a high frequency band and then supply the signal to the glass delay element thus requiring a video signal processing circuit. Also, the use of the video signal processing circuit tends to cause the signal level and frequency characteristic of its output video signal to differ from those of the output video signal from the other magnetic head and this in turn results in a flicker phenomenon in the reproduced picture. Also, due to the fact that in the signal processing circuit the balanced modulator includes an oscillator circuit, there is a disadvantage that a sufficient electrostatic shielding must be provided for the oscillator circuit with the resulting increase in the size of the circuits and mechanisms of the reproducing system.

SUMMARY OF THE INVENTION

It is therefore an object of the present invention to provide a magnetic recording system which overcomes the foregoing deficiencies and prevents the occurrence of any skew during the reproduction.

The present invention is so designed that during the recording of video signals the rotation speed of rotary magnetic heads is differed from the steady-state rotation speed and thus the period of the video signal for one field to be recorded on a single video track is made an integral multiple of the horizontal scanning period.

In accordance with the invention, there is the effect of preventing the occurrence of any skew with simple circuitry, eliminating the need to modify the reproducing circuit, reducing the manufacturing cost and making possible the reproduction of still pictures of good quality without any flicker.

BRIEF DESCRIPTION OF THE DRAWINGS

The present invention will be apparent from the following detailed descriptions taken in conjunction with the accompanying drawings, in which.

DESCRIPTION OF THE PREFERRED EMBODIMENTS

Figure 1:
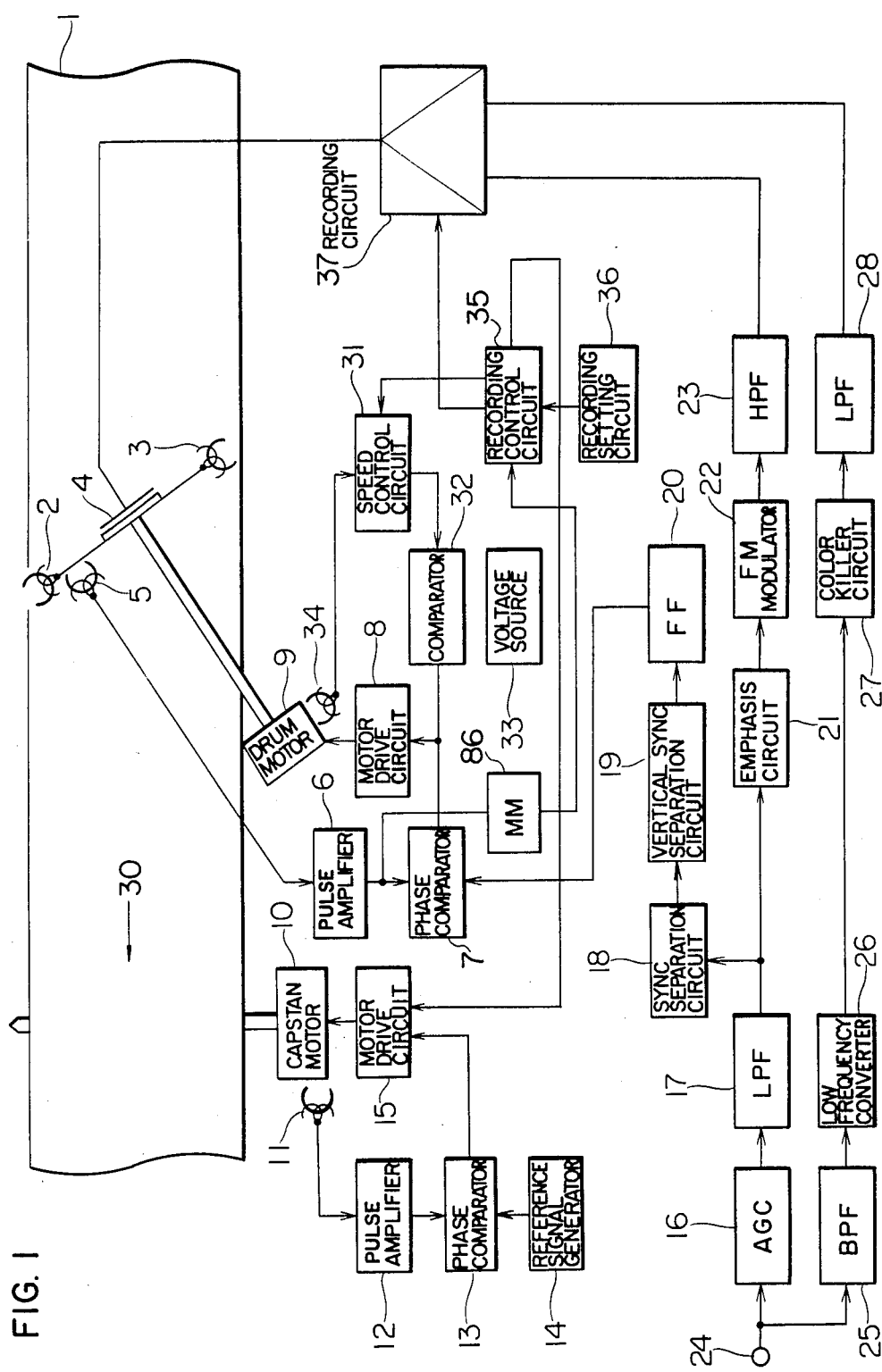
FIG. 1 is a block diagram showing an embodiment of a magnetic recording system according to the invention.

The magnetic recording system according to the invention will now be described with reference to the illustrated embodiments. FIG. 1 is a block diagram showing the principal parts of the magnetic recording system according to the invention. In the Figure, numeral 1 designates a magnetic tape wrapped helically over 180 degrees around a drum (not shown) for guiding the magnetic tape 1 and driven by a capstan motor 10 to move in the direction of an arrow 30.

The capstan motor 10 is operated by a motor drive circuit 15. The speed of the capstan motor 10 is controlled by a speed control loop. A pickup head 11 detects the rotation speed of the capstan motor 10 and its speed detection signal is amplified by a pulse amplifier 12. The speed detection signal amplified by the pulse amplifier 12 is supplied to a phase comparator 13 so that the phase comparator 13 compares the phase of a reference signal supplied from a reference signal generator 14 with the phase of the speed detection signal and generates an error signal corresponding to the phase difference. Then, the error signal is supplied to the motor drive circuit 15 and the rotation speed of the capstan motor 10 is controlled.

Numeral 24 designates a video signal input terminal and the video signal supplied to the input terminal 24 is supplied to an AGC circuit 16 and a band-pass filter 25. The video signal supplied to the AGC circuit 16 is controlled so that its amplitude becomes substantially flat and it is then supplied to a low-pass filter 17. The low-pass filter 17 suppresses the chrominance signal and passes only the luminance signal contained in the video signal and the luminance signal is supplied to a sync separation circuit 18 and an emphasis circuit 21. The sync separation circuit 18 separates the horizontal and vertical synchronizing signals from the luminance signal and supplies these synchronizing signals to a vertical sync separation circuit 19. The vertical sync separation circuit 19 separates only the vertical synchronizing signals from the synchronizing signals and supplies the separated vertical synchronizing signals to a flip-flop (FF) 20. The FF 20 divides the frequency of the vertical synchronizing signals by a factor of 2.

On the other hand, the high frequency components of the luminance signal supplied by the emphasis circuit 21 are emphasized by the emphasis circuit 21 and the emphasized luminance signal is supplied to an FM modulator 22. Then, the carrier signal is frequency modulated by the FM modulator 22 and supplied to a recording circuit 37 through a high-pass filter 23. On the other hand, the band-pass filter 25 separates the chrominance signal from the video signal supplied thereto and supplies the chrominance signal to a low frequency converter 26. The low frequency converter 26 converts the frequency of the chrominance subcarrier signal of the chrominance signal to a frequency band lower than the frequency band of the lower sideband signal of the luminance signal. The frequency converted chrominance signal is supplied to the recording circuit 37 through a color killer circuit 27 and a low-pass filter 28.

The recording circuit 37 combines and frequency multiplexes the luminance signal and the chrominance signal supplied to the recording circuit 37 and supplies the frequency multiplexed signal to the video heads 2 and 3 through a rotary transformer 4. To successively record the video signals supplied to the input terminal 24, the recording circuit 37 alternately supplies the video signals to the video heads 2 and 3 in response to the head selection signals generated from the multivibrator 86 and supplied through a recording control circuit 35 and the signals are successively recorded on the magnetic tape 1. In this case, the capstan motor 10 is rotated continuously and the magnetic tape 1 is moved at a predetermined tape speed. The multivibrator 86 receives the output of a pulse amplifier 6 and generates well-known head selection signals.

A drum motor 9 is provided to rotate the video heads 2 and 3 along the outer surface of the drum (not shown) and it is operated by a motor drive circuit 8. Numeral 5 designates a pickup head for detecting the rotational phases of the video heads 2 and 3 and it crosses the magnetic flux of magnets mounted on a rotor (not shown) which is driven by the drum motor 9 thus generating and supplying pulse-like drum pulse signals to the pulse amplifier 6. The pulse amplifier 6 amplifies the output pulses of the pickup head 5 and supplies them to a phase comparator 7. The $\frac{1}{2}$ V (vertical synchronizing) signals are also supplied to the phase comparator 7 from the output terminal of the FF 20 so that the phase of $\frac{1}{2}$ V (vertical synchronizing) signal is compared with the phase of the drum pulse signal from the pickup head 5 and an error signal corresponding to the phase difference is generated and supplied to the motor drive circuit 8. In accordance with the error signal supplied from the phase comparator 7, the motor drive circuit 8 control the rotation speed of the drum motor 9 and the video heads 2 and 3 are rotated in synchronism with the phase of the frame frequency of the video signals supplied to the input terminal 24.

Also, a second pickup head 34 is provided for the drum motor 9 and the rotation speed of the drum motor 9 is detected by the pickup drum 34. The speed detection signal detected by the pickup head 34 has a frequency proportional to the rotation speed of the drum motor 9 and this speed detection signal is supplied to a speed control circuit 31 which in turn converts the speed detection signal to a speed voltage inversely proportional to its frequency. This speed voltage is supplied to a comparator 32 which in turn compares the speed voltage with the reference voltage supplied from a reference voltage source 33 and generates an error signal corresponding to the difference between the voltages This error signal is supplied to the motor drive circuit 8 and in accordance with the error signal the motor drive circuit 8 drives the drum motor 9 in such a manner that its rotation speed is maintained constant Then, in the case of an intermittent recording for effecting a recording at intervals of a given time, the nunerical value of a recording pause period is applied to a recording setting circuit 36. This value provides the number of fields to be skipped, the number of an interval of fields for recording or the time during which the recording is stopped. In accordance with the applied numerical value the recording setting circuit 36 supplies a control signal to the recording control circuit 35. The multivibrator 86 also supplies the head selection signals to the recording control circuit 35 so that the recording control circuit 35 stops the supply of the head selection signals supplied to the recording circuit 37 to stop the recording and simultaneously the number of pulses of the head selection signals is counted until the count reaches the recording pause period applied to the recording setting circuit 36. In other words, during this time period no video signal is supplied to the magnetic heads 2 and 3 and no video signal is recorded on the magnetic tape 1 although the magnetic heads 2 and 3 are rotating. Also, during the recording pause period the recording control circuit 35 supplies a stop signal to the motor drive circuit 15 of the capstan motor 10 so that the rotation of the capstan motor 10 is stopped and the magnetic tape 1 is brought to rest.

The recording control circuit 35 counts the head selection signals so that when the count becomes equal to the preset value of the recording setting circuit 36, in synchronism with the head selection signal the recording control circuit 35 supplies to the recording circuit 37 a single intermittent recording gate pulse having the same pulse width as the pulse width of the head selection signals. In response to the intermittent recording gate pulse the recording circuit 37 supplies the video signal to one or the other of the video heads 2 and 3, e.g., the video head 2 during the time that the intermittent recording gate pulse is present and the video signal is recorded on the magnetic tape. Since the intermittent recording gate pulse is produced from the head selection signal and it has the same pulse width as the pulse width of the head selection signal, the video signal supplied to the video head 2 corresponds to one field of the video signals supplied to the input terminal 24. Since the drum motor 9 is rotated in synchronism with the phase of the head selection signals produced by the multivibrator 86, as soon as the video signal is supplied to the video head 2, the video head 2 starts contacting with the magnetic tape 1 and the video signal per field is recorded without any omission.

After the video signal per field has been recorded on the magnetic tape 1, upon completion of the recording the recording control circuit 35 stops the supply of the intermittent recording gate pulse supplied to the recording circuit 37. Thus, the recording circuit 37 again stops the supply of the video signals to the video heads 2 and 3 and the system is changed to the recording pause mode. Also, during this recording pause period the recording control circuit 35 supplies a start signal to the motor drive circuit 15 of the capstan motor 10 so that the capstan motor 10 is operated and the magnetic tape 1 is moved one video track width. Since the start signal supplied to the motor drive circuit 15 is only for the purpose of moving the magnetic tape 1 one video track width, the start signal is supplied for a short period of time and its supply is immediately stopped thereby stopping the operation of the capstan motor 10 again. After the generation of the intermittent recording gate pulse has been stopped, the recording control circuit 35 is reset and it again counts the pulses of the head selection signals. This process of operations is repeated and the video signals supplied to the input terminal 24 are intermittently recorded on the magnetic tape 1. In this connection, although not described, a control signal is recorded on the control track for detecting the position of the video track upon reproduction.

To reproduce the magnetic tape thus recorded intermittently, the movement of the magnetic tape is stopped and the reproducing video heads playback the same video track repeatedly. Thus, in the reproducing mode the outputs of the two video heads are alternately selected to generate a continuous reproduced video signal. In the case that the recording video heads are provided with azimuth angles for recording, the two reproducing video heads respectively have the same azimuth angles of the same directions as the recording.

In the magnetic recording system shown in FIG. 1, during the time that upon recording the recording control circuit 35 supplies a control signal to the speed control circuit 31 connected in the speed control loop for controlling the rotation speed of the drum motor 9 and the recording control circuit 35 generates an intermittent recording gate pulse, the rotation speed of the drum motor 9 is changed from its rotation speed in the normal condition. The occurrence of a skew is caused by the fact that the spacing between the horizontal synchronizing signals is not maintained at 1 H upon the switching between the output signal from one head and the output signal from the other head during the repeated reproduction of one video track for the reproduction of a still picture. Therefore, if the video signal recorded on one video track is so recorded that its period becomes for example 262 H (312 H) or 263 H (313 H) which is an integral multiple of the horizontal scanning period H, it is possible to prevent the occurrence of any skew upon reproduction.

With the magnetic recording system shown in FIG. 1, during the time that an intermittent recording gate pulse is generated from the recording control circuit 35, the rotation speed of the drum motor 9 is increased or decreased as compared with the normal rotation so that the period of the video signal per field recorded on one video track of the magnetic tape 1 becomes 262 H (312 H) or 263 H (313 H). The recording control circuit 35 counts the pulses of the head selection signals so that just before the time that the count value becomes equal to the preset value of the recording setting circuit 36, the recording control circuit 35 supplies to the speed control circuit 31 a control signal for changing the rotation spee of the drum motor 9 and the rotation speed of the drum motor 9 is changed.

Figure 2:
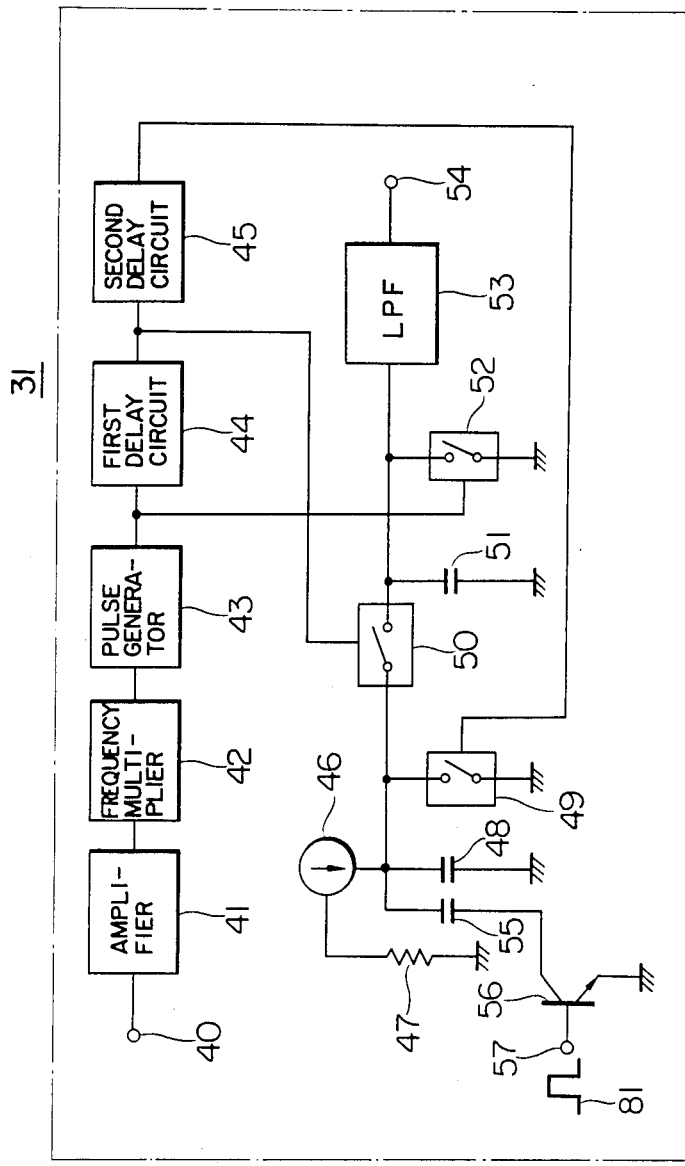
FIG. 2 is a block diagram of a speed control circuit.
Figure 3:
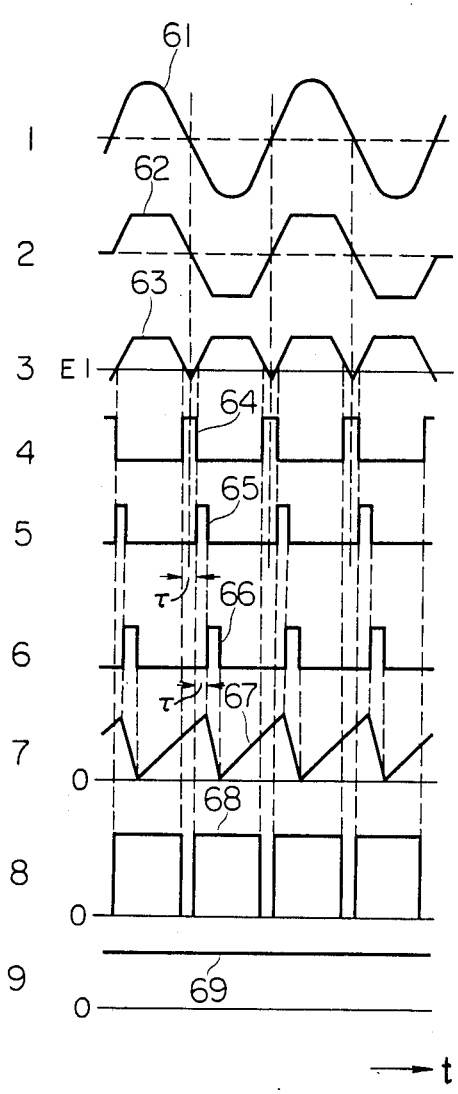
FIG. 3 shows a plurality of waveforms generated at various points in the circuit of FIG. 2.

FIG. 2 is a block diagram of the drum motor speed control circuit 31 and FIG. 3 shows the waveforms generated at various points in FIG. 2. In FIG. 2, the output signal from the pickup head 34 is supplied to an input terminal 40 and then the signal is supplied to an amplifier 41. The signal supplied to the amplifier 41 is a sinusoidal signal 61 as shown in (1) of FIG. 3 and it has a frequency proportional to the rotation speed of the drum motor 9. The amplifier 41 amplifies the speed detection signal supplied to the input terminal 40 until its saturation so that the peak of the signal is clipped as shown at a waveform 62 in (2) of FIG. 3 and it is supplied to a frequency multiplier 42. The frequency multiplier 42 is a multiplier and it may be composed of a full-wave rectifier circuit. As shown in (3) of FIG. 3, the frequency multiplier 42 reshapes the waveform of its input signal into a trapezoidal waveform 63 having the negative half-cycle folded back and its output signal is supplied to a pulse generator 43. The pulse generator 43 has a threshold level $E_1$ as shown in (3) of FIG. 3 and it generates a single pulse when the amplitude of the trapezoidal waveform 63 becomes lower than the threshold level $E_1$. The pulse generator 43 may be formed with a switch circuit which is turned on or off in response to the threshold level $E_1$ and its output signal is a pulse signal synchronized with the leading edge of the trapezoidal waveform 63 as shown by a pulse 64 in (4) of FIG. 3. Then, the output srgnal is supplied to a first delay circuit 44 which in turn generates a pulse signal 65 delayed by a given time $\tau$ as shown in (5) of FIG. 3 and the pulse signal 65 is then supplied to a second delay circuit 45 which in turn generates a pulse signal 66 further delayed by the given time $\tau$ as shown in (6) of FIG. 3. Numeral 46 designates a current source whose current output is determined by a control resistor 47 and used to charge a capacitor 48. Numeral 49 designates a reset switch circuit connected in parallel with the capacitor 48 and its on-off operation is controlled by the output pulse signal 66 of the second delay circuit 45. Numeral 50 designates a sampling switch circuit whose on-off operation is controlled by the output pulse signal 65 of the first delay circuit 44 so that when it is turned on, the stored voltage of the capacitor 48 is sampled and the sampled voltage is held by a hold capacitor 51. Numeral 52 designates a reset switch circuit whose on-off operation is controlled by the output pulse signal 64 of the pulse generator 43. Numeral 53 designates a low-pass filter, and 54 an output terminal.

With this circuit, each of the switch circuits 49, 50 and 52 is turned on by the leading edge of the pulse signal supplied thereto and is turned off by the trailing edge of the pulse signal. The capacitor 48 is charged with the constant current from the current source 46 when the switch circuit 49 is turned off and it is discharged instantaneously when the switch circuit 49 is turned on. The charging and discharging operation are repeatedly performed in synchronism with the output pulse signal 66 of the second delay circuit 45 and the capacitor 48 generates a sawtooth wave 67 as shown in (7) of FIG. 3. Then, the peak value of the sawtooth wave 67 is sampled and is then held by the hold capacitor 51 so that the switch circuit 50 is turned on just before the turning-on of the switch circuit 49 and the peak value of the sawtooth wave 67 is held as a holding voltage 68 by the capacitor 51 as shown in (8) of FIG. 3. Also, since the holding voltage on the capacitor 51 must be discharged at intervals of the period of the pulse signals 64 so as to always obtain a holding voltage proportional to the rotation speed of the drum motor 9, the switch circuit 52 is turned on by the output pulse signal 64 of the pulse generator 43 and the holding voltage of the capacitor 51 is discharged. The holding voltage of the capacitor 51 is smoothed by the low-pass filter 53 and a dc voltage 69 proportional to the rotation speed of the drum motor 9 is generated at the output terminal 54 as shown in (9) of FIG. 3. The dc voltage delivered to the output terminal 54 is supplied to the comparator 32 of FIG. 1.

The frequency of the speed detection signal 61 supplied to the amplifier 41 is proportFional to the rotation speed of the drum motor 9 so that the frequency is increased with increase in the rotation speed of the drum motor 9 and decreased with decrease in the rotation speed. The pulse signals 64, 65 and 66 supplied to the switch circuit 52, 50 and 49 are respectively, generated on the basis of the speed detection signal 61 and therefore the period of these pulse signals is also proportional to the rotation speed of the drum motor 9. Assuming now that T represents the repetition period of the pulse signals 64, 65 and 66, f the frequency of these pulse signals, I the current supplied to the capacitor 48 from the current source 46, C the capacitance value of the capacitor 48, and V the peak voltage stored in the capacitor 48, then the peak voltage V is given as follows:

$$V = \frac{I}{C} \cdot T + \frac{I}{C} \cdot \frac{1}{f} \quad (1)$$

As will be seen from the equation (1), the peak voltage of the stored voltage on the capacitor 48 is inversely proportional to the frequency f of the pulse signals 64, 65 and 66 and the capacitance value C of the capacitor 48 and proportional to the current I. Also, the hold capacitor 51 holds the peak voltage of the capacitor 48 and therefore the holding voltage on the capacitor 51 varies in inverse proportion to the rotation speed of the drum motor 9. In other words, the holding voltage decreases with increase in the rotation speed of the drum motor 9 and increases with decrease in the rotation speed. Then, this voltage is supplied to the comparator 32 of FIG. 1 through the output terminal 54 and compared with the voltage of the reference voltage source 33, with the result that the motor drive circuit 8 is controlled by the resulting error voltage signal and thus the rotation speed of the drum motor 9 is caused to approach the rotation speed set by the voltage of the reference voltage source 33.

To intentionally change the rotation speed of the drum motor 9, it is necessary only to change the capacitance value C of the capacitor 48 or the current I of the current source 46 as indicated by the equation (1). In the speed control circuit shown in FIG. 2, a capacitor 55 is connected in parallel with the capacitor 48 and the capacitor 55 is grounded via the collector-emitter path of a switching transistor 56. When a switching signal 81 is supplied to an input terminal 57 connected to the base of the transistor 56, so long as the switching signal 81 is at the high level, the transistor 56 is turned on and the capacitor 55 is grounded thus connecting the capacitor 55 in parallel with the capacitor 48. As a result, the combined capacitance is increased and the peak value of the voltage stored in the capacitors 48 and 55 is decreased. When this occurs, the dc voltage generated from the output terminal 54 is decreased so that the comparator 32 of FIG. 1 generates an error signal tending to decrease the rotation speed of the drum motor 9 and thus the rotation speed of the drum motor 9 is decreased. The recording control circuit 35 generates and supplies the switching signal 81 as a speed control signal to the input terminal 57 just before the generation of an intermittent recording gate pulse.

Figure 4:
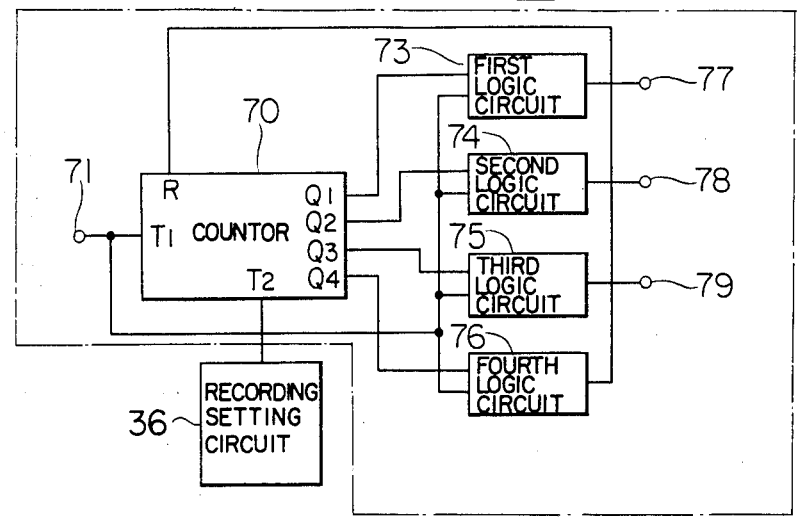
FIG. 4 is a block diagram of a recording control circuit.
Figure 5:
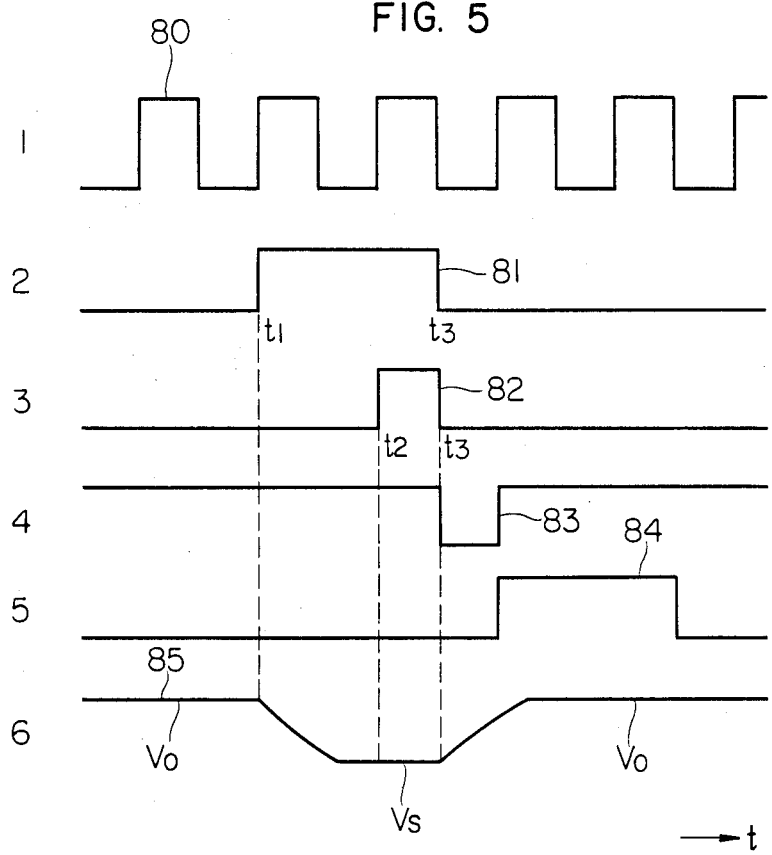
FIG. 5 is a timing chart for the circuit of FIG. 4.

FIG. 4 is a block diagram of the recording control circuit 35 and FIG. 5 is a timing chart of the recording control circuit 35. In FIG. 4, numeral 70 designates a counter for counting the head selection signals or the output signals of the multivibrator 86 of FIG. 1 which are supplied to an input terminal 71. The head selection signals are shown at a waveform 80 in (1) of FIG. 5. Numeral 36 designates a recording setting circuit which presets the numerical value of an interval of fields for recording, that is, the value of "5" is preset for recording every fifth field and the value of "15" is preset for recording every fifteenth field. When a start signal for starting the intermittent recording is applied, the recording setting circuit 36 supplies the preset value to an input terminal $T_2$ of the counter 70. When the numerical value is supplied from the recording setting circuit 36, the counter 70 is set to the value so that it is first reset and the pulse of the head selection signals 80 are counted starting from the zero count. When the count reaches the preset value supplied from the recording setting circuit 36, the counter 70 is reset and it again counts the head selection signals from the zero count. Numeral 73 designates a first logic circuit whose one input terminal is supplied with the output signal from an output terminal $Q_1$ of the counter 70 and the other input terminal is supplied with the head selection signals supplied to the input terminal 71. Numeral 74 designates a second logic circuit whose one input terminal is supplied with the output signal from an output terminal $Q_2$ of the counter 70 and the other input terminal is supplied with the head selection signals. Numeral 75 designates a third logic circuit whose one input terminal is supplied with the output signal from an output terminal $Q_3$ of the counter 70 and the other input terminal is supplied with the head selection signals. Numeral 76 designates a fourth logic circuit whose one input terminal is supplied with the output signal from an output terminal $Q_4$ of the counter 70 and the other input terminal is supplied with the head selection signals. The output terminal of the logic circuit 76 is connected to a reset terminal R of the counter 70. The counter 70 counts the head selection signals so that when the count reaches the value preset by the recording setting circuit 36, an intermittent recording gate pulse 82 is generated at the output terminal $Q_2$ as shown in (3) of FIG. 5. Then, the intermittent recording gate pulse 82 is supplied to an output terminal 78 through the logic circuit 74. The logic circuit 74 may for example be composed of an AND circuit. The intermittent recording gate pulse 82 generated at the output terminal 78 is supplied to the recording circuit 37 of FIG. 1 and the video signal is supplied to the video head during the time that the intermittent recording gate pulse 82 remains at the high level. Also, at a time preceding the generation of the intermittent recording gate pulse 82 by two fields, the counter 70 generates a speed control signal 81 for the duration of three fields at the output terminal $Q_1$ as shown in (2) of FIG. 5 and supplies it to the logic circuit 73. The logic circuit 73 may for example be a flip-flop which is set and reset in response to the speed control signal 81 and it delivers the speed control signal 81 generated at the output terminal $Q_1$ of the counter 70 to an output terminal 77. The output terminal 77 is connected to the input terminal 57 of FIG. 2 and the speed control signal 81 is supplied as a switching signal to the transistor 56. In other words, the rotation speed of the drum motor 9 is decreased during the high level period of the speed control signal 81. When the intermittent recording gate pulse 82 is generated, the counter 70 generates a reset pulse 83 at the output terminal $Q_4$ in response to the next head selection signal 80 as shown in (4) of FIG. 5. The reset pulse 83 is supplied to the reset terminal R of the counter 70 through the logic circuit 76 which may for example be an AND circuit and the counter 70 is reset. As a result, the counter 70 again starts counting from the zero count up to the preset value. When the counting is restarted after the resetting, the counter 70 generates a capstan motor control signal 84 at the output terminal $Q_3$ as shown in (5) of FIG. 5. The capstan motor control signal 84 is delivered to an output terminal 79 through the logic circuit 75. The output terminal 79 is connected to the motor drive circuit 15 of FIG. 1 so that during the high level period of the capstan motor control signal 84 the motor drive circuit 15 operates the capstan motor 10 and the magnetic tape 1 is run. In this case, the magnetic tape 1 is moved one video track width. Also, the motor drive circuit 15 stops the operation of the capstan motor 10 during the low level period of the capstan motor control signal 84.

Shown in (6) of FIG. 5 is the variation in the rotation speed of the drum motor 9, that is, the rotation speed gradually decreases from the steady-state rotation speed $V_o$ starting at a time $t_1$ at which the speed control signal 81 is generated from the counter 70 so that the rotation speed of the drum motor 9 is decreased to a predetermined rotation speed $V_s$ before a time $t_2$ at which the intermittent recording gate pulse 82 is generated and this condition is maintained until a time $t_3$ at which the intermittent recording gate pulse 82 goes to the low level. After the time $t_3$, the rotation speed is gradually increased and it returns to the steady-state rotation speed $V_o$. With the drum motor 9 rotating at the steady-state rotation speed $V_o$, if the transistor 56 of FIG. 2 is turned on so as to decrease the rotation speed of the drum motor 9, the drum motor 9 cannot be rapidly slowed down due to its inertia. Therefore, the speed control signal 81 goes to the highe level at the time $t_1$ which precedes by two fields the time $t_2$ at which the intermittent recording gate pulse 82 goes to the high level. As a result, the rotation speed is descreased to the predetermined speed $V_s$ by the time $t_2$ at which the intermittent recording gate pulse 82 goes to the high level. Where the inertia of the drum motor 9 is small, the time of generation of the speed control signal may be retarded.

When it is desired to change the recording period of one field fro 262.5 H (312.5 H) to 263 H (313 H), the capacitance value of the capacitor 55 connected in parallel with the capacitor 48 in FIG. 2 shoudl be selected about 0.2% (0.16%) of that of the capacitor 48. Where the period is changed to 264 H (314 H), the capacitance value should be selected about 0.6% (0.48%). Where the transistor 56 is turned on so as to decrease the rotation speed of the drum motor 9, if $V_s$ represents the decreased rotation speed and $V_o$ represents the steady-state rotation speed and if the recording period of one field is 263 H (313 H), the following equations are held:

$$\frac{1}{V_o} : \frac{1}{V_s} = 262.5\ H\ (312.5\ H) : 263\ H\ (313\ H) \qquad (2)$$

$$\frac{V_s}{V_o} = 0.998\ (0.998) \qquad (3)$$

Thus, the rotation speed $V_s$ can be selected lower than the steady-state rotation speed $V_o$ by 0.2% (0.16%). To select the recording period of one field 264 H (314 H), it is only necessary to make the former lower than the latter by 0.6% (0.48%) and thus it is only necessary to slightly change the rotation speed of the drum motor 9. Then, the transistor 56 must be turned on just before the recording. The reason is that if the transistor 56 is held on, the dc output voltage of the speed control circuit 31 is corrected by the phase control loop of the drum motor 9 and the intentionally decreased rotation speed is restored to the normal rotation speed thus failing to make the recording period of one period an integral multiple of the horizontal scanning period H. Alternatively, in FIG. 4 the input erminal 71 of the counter 70 may be connected to the output terminal 78 of the logic circuit 74 through a switching circuit so as to directly supply the head selection signals to the recording circuit 37 for continuous recording purposes.

Figure 6:
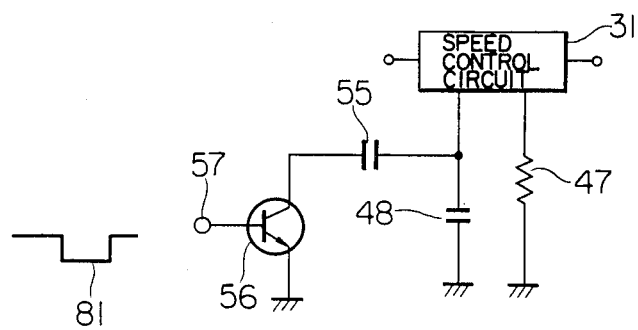
FIG. 6 is a block diagram showing another embodiment of the speed control circuit.
Figure 7:
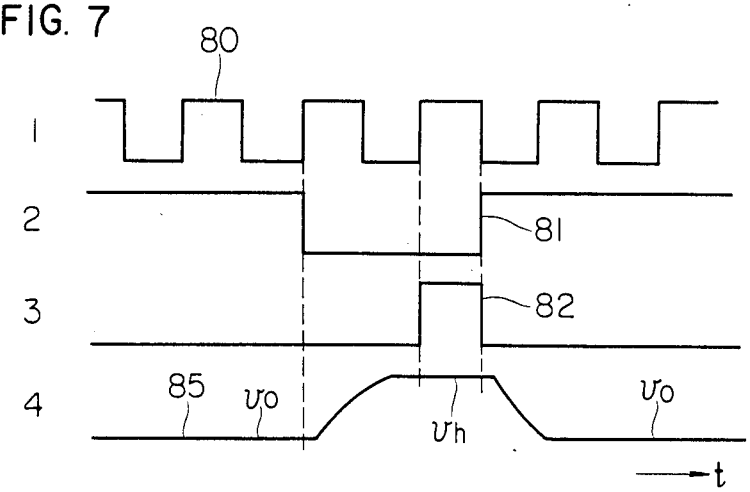
FIG. 7 is a timing circuit for the circuit of FIG. 6.

FIG. 6 shows another embodiment of the speed control circuit 31 and FIG. 7 is a timing chart for the circuit of FIG. 6. The circuit of FIG. 6 shows the capacitors 48 and 55, the resistor 47 and the transistor 56 separately. The circuit of FIG. 6 is such that the transistor 56 is turned on during the recording pause period and the transistor 56 is turned off in response to the supply of a speed control signal 81. In the case that the combined capacitance of the capacitors 48 and 55 is selected so as to provide the steady-state rotation speed of the drum motor 9, when the transistor 56 is turned off, the combined capacitance is decreased and the output voltage of the speed control circuit 31 is increased. Thus, the comparator 32 of FIG. 1 generates an error voltage tending to increase the rotation speed of the drum motor 9 and the rotation speed of the drum motor 9 is increased as shown in (4) of FIG. 7. In other words, during the time that the speed control signal 81 is supplied, the rotation speed of the drum motor 9 is changed from the steady-state rotation speed $V_o$ to a higher speed $V_h$ and an intermittent recording gate pulse 82 is generated in this period. Thus, the period of a video signal recorded on the magentic tape 1 become 262 H (312 H) or 261 H (311 H) which is an integral multiple of the horizontal scanning period H.

Figure 8:
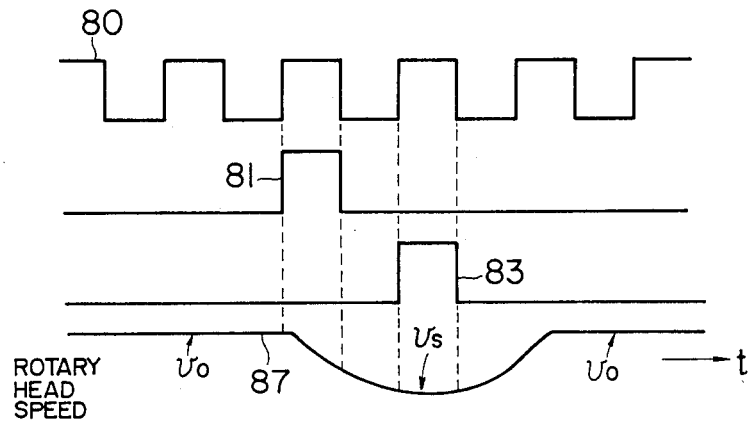
FIG. 8 is another timing chart for the speed control circuit.

FIG. 8 shows a proper embodiment of this invention applied to a time-lapse video tape recorder, in which even if the additional period of the capacitor 55 is made short, that is, 1/60 sec., as shown in the speed control signal 81, the value very close to $V_s$ at the reset pulse 83 can be obtained by means of the inertia of the rotary head, and accordingly the same operation as shown in FIG. 6 is performed.

Figure 9:
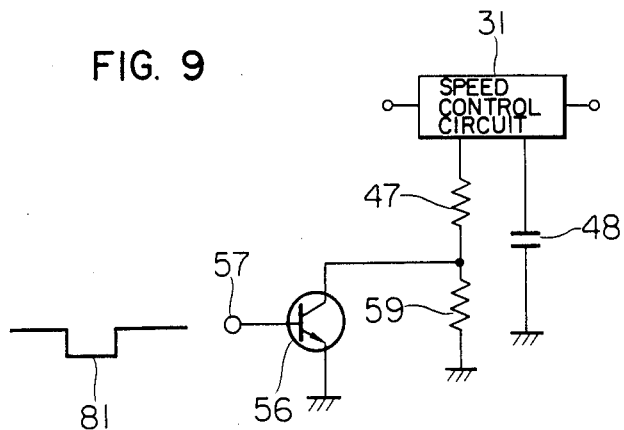
FIG. 9 is a block diagram showing still another embodiment of the speed control circuit.

FIG. 9 shows still another embodiment of the speed control circuit 31 of this invention which differs from the embodiment of FIG. 2 in that the resistance value of the resistor 47 for controlling the current output of the current source 46 is changed to vary the current flow from the current source 46. The voltage stored in the capacitor 48 is proportional to the current I as shown by the equation (1). Thus, by varying the current flow from the current source 46 just before the intermittent recording, it is possible to change the rotation speed of the drum motor 9 during the intermittent recording. In the circuit of FIG. 9, a resistor 59 is connected in series with the resistor 47 and the combined resistance is varied to change the current flow from the current source 46. The circuit of FIG. 9 is such that during the recording pause period the speed control signal 81 goes to the high level and the transistor 56 is turned on. Thus, the resistor 59 is shortcircuited by the transistor 56 and the current source 46 provides a current flow determined by the resistor 47 thereby ensuring the normal rotation. Then, only durng the time that the speed control signal 81 goes to the low level, the resistor 59 is connected in series with the resistor 47 and their combined resistance value is increased thus decreasing the current flow from the current source 46. When the transistor 56 is turned off, the output voltage of the circuit is decreased and the rotation speed of the drum motor 9 is decreased. As a result, the period of a video signal recorded on the magnetic tape 1 becomes 263 H (313 H) or 264 H (314 H). It is possible to reverse the polarity of the speed control signal so that the transistor 56 is turned off during the recording pause period and it is turned on only during the recording. In this case, the period of the recorded video signal becomes 262 H (312 H) or 261 H (311 H).

While, in the foregoing description, during the intermittent recording the speed control circuit 31 is controlled so as to vary its output voltage, alternatively the voltage of the reference voltage source 33 connected to the comparator 32 may be varied during the recording and it is only necessary that during the recording the rotation speed of the video heads is increased or decreased as compared with the steady-state rotation speed. This can be accomplished by varying the output of the motor drive circuit for the dum motor during the recording or by momentarily operating the brake circuit of the drum motor. Alternativley, the mechanical connection between the drum motor and the video heads may be disconnected for a monent.

While, in the above-described embodiments, the period of the video signal per field is selected 262.5 H, in the case of 312.5 H according to the CCIR system it is only necessary to record video signals so that their period becomes for example 312 H or 313 H which is an intergral multiple of the horizontal scanning period.

What is claimed is:

1. A magnetic recording system comprising:
    tape moving means for intermittently moving a magnetic tape;
    intermittent recording means for recording of about one field of video signals in the width direction of said magnetic tape by at least one of a plurality of rotary magnetic heads when said magnetic tape is stopped, and for stopping the recording of said video signals when said magnetic tape is moved;
    head driving means for rotating said rotary magnetic heads at a predetermined rotary speed; and
    control means for controlling said head driving means to control the rotary speed of said rotary magnetic heads so that said intermittent recording means enables recording of about one field of said video signals on said magnetic tape for a period which is an integral multiple of a horizontal scanning period when said magnetic tape is stopped.

2. A magnetic recording system according to claim 1, wherein said tape moving means comprises a first motor circuit including a capstan motor for intermittently moving said magnetic tape, said intermittent recording means comprises:
    a recording circuit for supplying said video signals to said rotary magnetic heads and for enabling recording of said video signals on said magnetic tape by said heads, and
    a circuit for generating pulse-like head selection signals to alternately select one of said rotary magnetic heads at intervals of one field; and
    said head driving means comprises a second motor circuit including a head motor for rotating said rotary magnetic heads; and
    said control means comprises:
    a speed control circuit means, connected to the second motor circuit of said head driving means, for controlling and varying the rotary speed of said rotary magnetic heads through said second motor circuit,
    recording setting means for presetting a recording pause period of said video signals and for generating a control signal corresponding to the value of said preset pause period, and
    recording control circuit means for receiving said head selection signals and said control signal and for controlling said recording circuit and said speed control circuit means, said recording control circuit means including;
    counter means for counting the number of pulses of said head selection signals,
    a first control circuit for supplying an intermittent recording gate pulse to said speed control means and for varying the rotary speed of said head motor of said second motor circuit through said speed control circuit means while said intermittent recording gate pulse is outputted, a second control circuit for placing said recording circuit in a recording pause mode during a pulse counting period, and for supplying said intermittent recording gate pulse to said recording circuit when said pulse count is coincident with said preset value of said recording setting means, and for placing said recording circuit in a recording mode for the duration of said intermittent recording gate pulse whereby after recording of about one field of said video signals the supply of said intermittent recording gate pulse to said recording circuit is stopped and said recording circuit is again placed in said recording pause mode, a third control circuit whereby during said recording pause period said capstan motor of said first motor circuit is operated intermittently to move said magnetic tape one video track width, and a fourth control circuit for resitting the head selection signal count of said second control means when the supply of said intermittent recording gate pulse is stopped.

3. A magnetic recording system according to claim 2, wherein said speed control circuit means comprises:

a head motor speed control circuit for generating a speed control signal corresponding to the rotary speed of said head motor and for controlling the rotary speed of said head motor so as to be a constant speed, a speed control circuit connected to the first control circuit of said recording control circuit means for receiving an output of said first control circuit to control said head motor speed control circuit and to change the rotary speed of said head motor to a predetermined speed;

said counter means comprises a counter which is set at the set value of said recording setting means and counts said head selection signals, said counter outputting reset pulses and said intermittent recording gate pulse when the count value of said head selection signals is coincident with the set value of said recording setting means, and for generating a speed control signal for the duration of three fields at a time preceding the generation of the intermittent recording gate pulse by two fields, and for generating a motor control signal for controlling the capstan motor of said first motor circuit at the time of recounting said head selection signals, said first control circuit comprises a circuit for receiving the speed control signal of said counter and the head selection pulses and for supplying the speed control signal and head selection pulses to the speed control circuit of said control circuit means and for controlling the rotary speed of said head motor through the speed control circuit;

said second control circuit comprises a circuit for receiving the intermittent recording gate pulse of said counter and said head selection pulses and for placing said recording circuit in a recording mode during a predetermined generation period of said intermittent recording gate pulse and for placing said recording circuit in a recording pause mode during a time period other than the generation period, said third control circuit comprises a circuit for receiving the motor control signal of said counter and said head selection pulses and for controlling said capstan motor so that the magnetic tape moves one video track, and said fourth control circuit comprises a circuit for receiving a reset pulse of said counter and said head selection pulses to reset said counter.

4. A system according to claim 3, wherein said head motor speed control means comprises:

a speed detection circuit for detecting the rotation speed of said head motor to generate a sinusoidal signal proportional to said detected rotation speed;

a multiplier circuit for multiplying the frequency of the output signal from said speed detection circuit;

a pulse generating circuit for receiving an output signal of said multiplier circuit to generate a control pulse corresponding to said head motor speed;

a first delay circuit for delaying the output pulse of said pulse generating circuit by a predetermined time, a second delay circuit for further delaying the delayed output signal of said first delay circuit by said predetermined time;

a current source;

a charging circuit including a capacitor for storing a current output from said current source;

a reset circuit including a switch circuit connected in parallel with said charging circuit capacitor to discharge the stored voltage of said capacitor;

a sampling circuit connected to said charging circuit and including another switch circuit for sampling the stored voltage of said capacitor;

a holding circuit including a reset switch circuit and another capacitor and connected to an output stage of said sampling circuit to generate from said sampled signal a voltage inversely proportional to the rotation speed of said head motor and to hold said voltage;

a generating circuit connected to said holding circuit to generate from said holding voltage a dc voltage inversely proportional to the rotational speed of said head motor and to supply the dc voltage to a motor driver circuit of said head motor thereby controlling the rotation speed of said head motor;

first circuit means for supplying the delayed output pulse of said first delay circuit to said sampling circuit to turn on and off said switch circuit in response thereto; and second circuit means for supplying the delayed output pulse of said second delay circuit to said switch circuit of said reset circuit to turn on and off said switch circuit in response thereto;

wherein said speed control circuit connected to said first control circuit comprises a transistor for receiving and switching said speed control signal and a capacitor connected to said transistor and said charging circuit and further connected in parallel with said charging circuit when said transistor turns on.

5. A system according to claim 3, wherein said head motor speed control means comprises:

a speed detection circuit for detecting the rotation speed of said head motor to generate a sinusoidal signal proportional to said detected rotation speed;

a multiplier for multiplying the frequency of the output signal from said speed detection circuit;

a pulse generating circuit for receiving an output signal of said multiplier circuit to generate a control pulse corresponding to said head motor speed;

a first delay circuit for delaying the output pulse of said pulse generating circuit by a predetermined time;

a second delay circuit for further delaying the delayed output signal of said first delay circuit by said predetermined time;

a current source;

a charging circuit including a capacitor for storing a current output from said current source;

a reset circuit including a switch circuit connected in parallel with said charging circuit capacitor to discharge the stored voltage of said capacitor;

a sampling circuit connected to said charging circuit and including another switch circuit for sampling the stored voltage of said capacitor;

a holding circuit including a reset switch circuit and another capacitor and connected to an output stage of said sampling circuit to generate from said sampled signal a voltage inversely proportional to the rotation speed of said head motor and to hold said voltage;

a generating circuit connected to said holding circuit to generate from said holding voltage a dc voltage inversely proportional to the rotational speed of said head motor and to supply the dc voltage to a motor driver circuit of said head motor thereby controlling the rotation speed of said head motor;

first circuit means for supplying the delayed output pulse of said first delay circuit to said sampling circuit to turn on and off said switch circuit in response thereto; and second circuit means for supplying the delayed output pulse of said second delay circuit to said switch circuit of said reset circuit to turn on and off said switch circuit in response thereto;

wherein said speed control circuit connected to said current source comprises a resistance circuit including a plurality of resistors for setting the current volume of said current source to said charging circuit and a transistor connected to said resistance circuit and said first control circuit for receiving the speed control signal and turning on to change the resistance value of said resistor.

6. A magnetic recording system including:

recording means including at least first and second rotary magnetic heads for forming video tracks on a magnetic tape in the width direction of said magnetic tape through said rotary magnetic heads, and for recording video signals on said video tracks;

a first motor circuit including a capstan motor for moving said magnetic tape;

a second motor circuit including a motor for rotating said first and second magnetic heads;

means including a circuit for generating and outputting head selection signals to transmit said video signals to one of said first and second rotary magnetic heads in said recording means, for supplying said head selection signals to said recording means, and for supplying said video signals to one of said first and second rotary magnetic heads for about one field; and intermittent recording mode means for enabling operation of said recording means and said first motor circuit in an intermittent recording mode, the capstan motor of said first motor circuit being intermittently driven by said means to make said magnetic tape repeat modes of moving/stopping and to operate said recording means in a recording mode during a period for recording one field of said video signals when said magnetic tape is stopped, and to operate said recording means in a recording pause mode when said magnetic tape is moved, wherein said system further comprises:

head motor speed control means connected to said second motor circuit for varying the rotary speeds of said first and second rotary magnetic heads through said motor; and control means for controlling the rotary speed of said motor through said motor speed control means when about one field of said video signals in said intermittent recording mode is recorded so that about one field of said video signals is recorded on a video track of said magnetic tape by one of said first and second magnetic heads for a period which is an integral multiple of a horizontal scanning period then said magnetic tape is stopped.

7. A magnetic recording system according to claim 6, wherein said intermittent recording mode means comprises:

a recording setting circuit for presetting a recording pause period of said recording means; and means for receiving the head selection signals of said head selection signal generating dircuit and a reset value of said recording setting circuit; and for controlling said recording means, said first motor circuit and said head motor speed control means in accordance with the states of the head selection signals and the reset value, and said control means comprises:

a counter portion and a reset portion for counting the pulse number of said head selection signals, which are reset when the pulse number is counted up to said recording preset value, and thereafter are recounted;

a first control circuit for placing said recording means in a recording pause mode when the count number of said head selection signals of said counter portion is not consistent with the preset value of said recording setting circuit, and for releasing the recording pause of said recording means during the period of about one field of the video signals when the count number of said head selection signals is consistent with the preset value of said recording setting circuit, and for controlling said recording means in a recording mode;

a second control circuit for operating said capstan motor of said first motor circuit during the recording mode, and for intermittently operating said capstan motor of said first motor circuit after recording of the video signals during the recording mode to move said magnetic tage one video trabk width; and a third control circuit for varying the rotary speed of the motor of said second motor circuit through said head motor speed control means during said intermittent recording mode, and for controlling the information period of about one field of the video signals recorded on a video track of said magnetic tape by one of said first and second rotary magnetic heads such that the information period becomes an integral multiple of the horizontal scanning period.

8. A magnetic recording system according to claim 7, wherein said head motor speed control means comprises:

a speed detecting circuit for detecting the speed of a head durm motor of said second motor circuit and for outputting a sinusoidal signal in proportion to the detected signal;

a frequency multiplier for multiplying said sinusoidal signal from said speed detecting circuit;

a pulse generator for receiving an output signal from said frequency multiplier and for outputting a control pulse corresponding to the rotary speed of said motor;

a first delay circuit for delaying the control pulse from said pulse generator by a predetermined time;

a second delay circuit for further delaying a delayed output pulse from said first delay circuit by a predetermined time;

a current source;

a charging circuit for charging current volume of said current source, said charging circuit including a capacitor for setting the rotary speed of said head drum motor for a normal recording and reproducing mode speed;

a discharging circuit comprising an first switch circuit connected in parallel with said charging circuit, said first switch circuit receiving a delayed pulse signal from said second delay circuit and performing ON/OFF operation to generate a sawtooth wave;

a sampling circuit, comprising a second switch circuit connected to said charging circuit, and a switch circuit of said sampling circuit, receiving the delayed output pulse from said first delay circuit to perform ON/OFF operation and or sampling the sawtooth wave of said charging circuit;

a holding circuit comprising a signal hold capacitor connected to an output stage of said sampling circuit for holding a peak value of said sawtooth wave, and a signal hold reset switch circuit for receiving the output pulse of said pulse generator to perform ON/OFF operation and to generate said hold signal in proportion to the rotary speed of said head drum motor;

a generating circuit means connected to said holding circuit for generating a dc voltage in proportion to the rotary speed of said head drum motor from a value held by the capacitor and for supplying the dc voltage to control the rotary speed of said head drum motor in said second motor circuit; and a circuit for varying the capacitance value of said charging circuit in response to a speed control signal of a first control ciruit of said control means to vary the rotary speed of said head drum motor.

* * * * *